United States Patent
Jin

(10) Patent No.: US 10,965,332 B2
(45) Date of Patent: Mar. 30, 2021

(54) ECHO CANCELLATION (EC) TRAINING FOR A FULL DUPLEX (FDX) AMPLIFIER

(71) Applicant: Cisco Technology, Inc., San Jose, CA (US)

(72) Inventor: Hang Jin, Plano, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 66 days.

(21) Appl. No.: 16/362,917

(22) Filed: Mar. 25, 2019

(65) Prior Publication Data
US 2020/0313705 A1    Oct. 1, 2020

(51) Int. Cl.
| | |
|---|---|
| *H04B 1/10* | (2006.01) |
| *H04B 10/61* | (2013.01) |
| *H04B 10/69* | (2013.01) |
| *H04J 14/00* | (2006.01) |

(52) U.S. Cl.
CPC ............ *H04B 1/10* (2013.01); *H04B 10/612* (2013.01); *H04B 10/697* (2013.01); *H04J 14/00* (2013.01)

(58) Field of Classification Search
CPC ............... H04B 10/612; H04B 10/697; H04B 10/2504; H04B 1/10; H04B 3/234; H04B 3/32; H04J 14/00
See application file for complete search history.

(56) References Cited

U.S. PATENT DOCUMENTS

| | | | | |
|---|---|---|---|---|
| 4,891,801 | A * | 1/1990 | Marcos | H04B 3/235 370/290 |
| 7,680,265 | B2 * | 3/2010 | Piket | H04M 9/082 379/406.08 |
| 8,098,770 | B2 * | 1/2012 | Shusterman | H04L 25/022 375/329 |
| 8,731,183 | B1 * | 5/2014 | Goodson | H04B 3/23 379/406.01 |
| 2006/0014491 | A1 * | 1/2006 | Cleveland | H04B 7/15571 455/17 |
| 2016/0134313 | A1 * | 5/2016 | Olsson | H04B 1/1018 375/219 |
| 2017/0048094 | A1 * | 2/2017 | Bae | H04L 25/024 |
| 2018/0205532 | A1 * | 7/2018 | Chapman | H04B 3/23 |
| 2018/0219577 | A1 * | 8/2018 | Zhang | H04B 3/23 |
| 2018/0343033 | A1 * | 11/2018 | Sun | H04B 3/487 |
| 2019/0349026 | A1 * | 11/2019 | Rainov | H04B 3/142 |

\* cited by examiner

*Primary Examiner* — Rasheed Gidado
(74) *Attorney, Agent, or Firm* — Merchant & Gould P.C.

(57) ABSTRACT

Echo Cancellation (EC) training for a Full Duplex (FDX) amplifier may be provided. First, a Downstream (DS) signal at a fixed location on a subcarrier frequency may be received. Next, an Upstream (US) echo may be determined from the received DS signal at the fixed location on the subcarrier frequency. Determining the upstream echo may comprise subtracting a known value from the received DS signal at the fixed location on the subcarrier frequency. An Echo Cancelation (EC) coefficient may then be determined. Determining the EC coefficient may comprise dividing the determined US echo by a reference signal comprising an US signal. Next, EC may be performed. Performing EC may comprise subtracting the echo from the DS signal.

20 Claims, 6 Drawing Sheets

ECHO CANCELLATION (EC) TRAINING FOR A FULL DUPLEX (FDX) AMPLIFIER

TECHNICAL FIELD

The present disclosure relates generally to echo cancellation.

BACKGROUND

A Hybrid Fiber-Coaxial (HFC) network is a broadband network that combines optical fiber and coaxial cable. It has been commonly employed globally by cable television operators. In an HFC cable network, television channels are sent from a cable system's distribution facility to local communities through optical fiber trunk lines. At the local community, a box translates the signal from a light beam to electrical signal, and sends it over cable lines for distribution to subscriber residences. The optical fiber trunk lines provide adequate bandwidth to allow future expansion and new bandwidth-intensive services.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
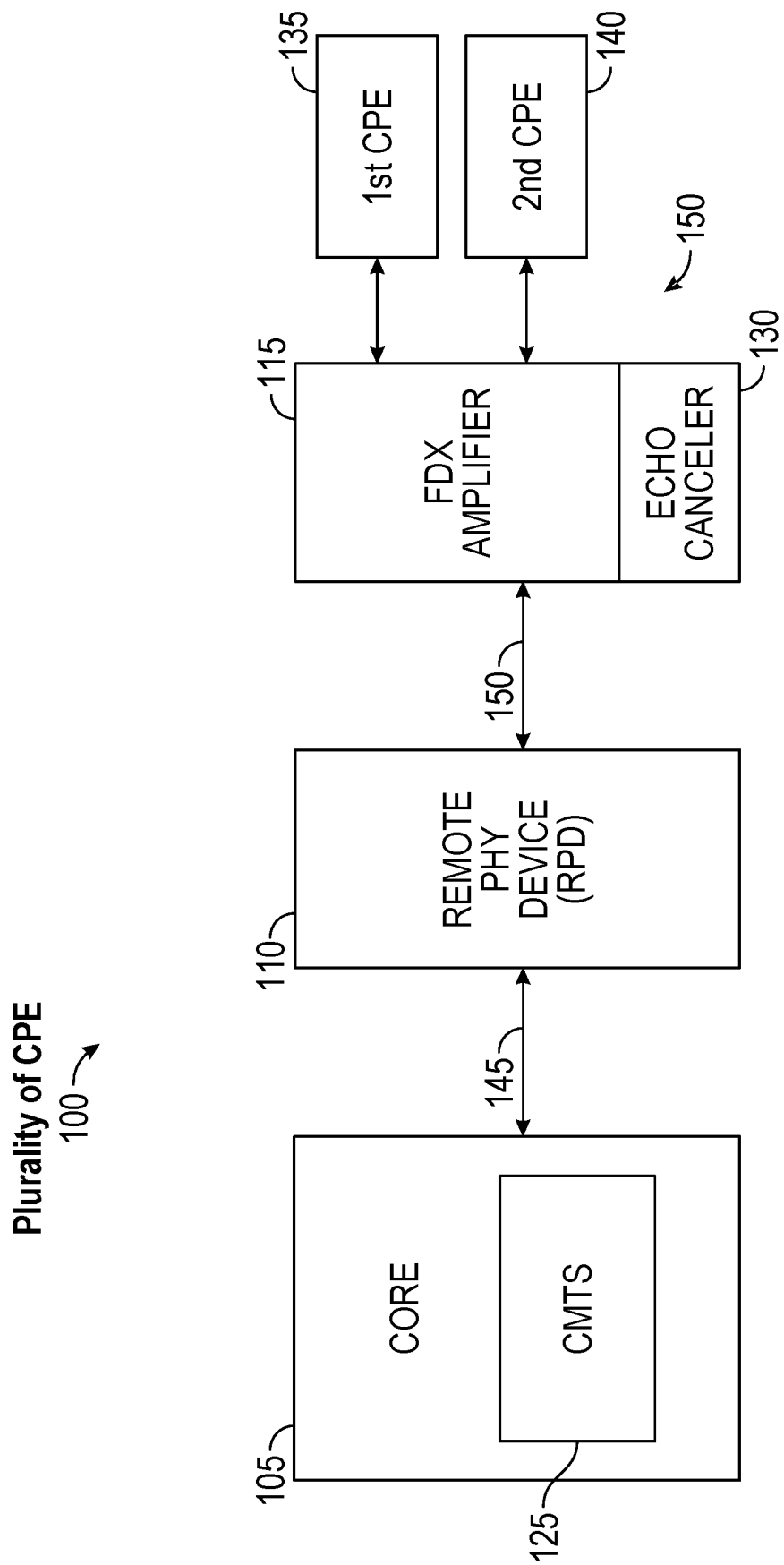
FIG. 1 is a block diagram of a system for providing Echo Cancellation (EC) training.

Echo Cancellation (EC) training for a Full Duplex (FDX) amplifier may be provided. First, a Downstream (DS) signal at a fixed location on a subcarrier frequency may be received. Next, an Upstream (US) echo may be determined from the received DS signal at the fixed location on the subcarrier frequency. Determining the upstream echo may comprise subtracting a known value from the received DS signal at the fixed location on the subcarrier frequency. An Echo Cancelation (EC) coefficient may then be determined. Determining the EC coefficient may comprise dividing the determined US echo by a reference signal comprising an US signal. Next, EC may be performed. Performing EC may comprise subtracting the US echoes from the DS signal.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Multiple-system operators (MSOs) are operators of multiple cable or direct-broadcast satellite television systems. These systems may include HFC networks. To amplify upstream (US) signals and downstream (DS) signals in the HFC network, MSOs may use nodes deployed within the HFC. In the HFC network, a node may comprise a container that may house optical and electrical circuitry. An optical fiber cable or a coaxial cable may be connected to an input side of the node and a plurality of coaxial cables may be connected to a output side of the node. The input side of the node may be connect to a headend in the HFC network and the DS side of the node may be connected to Customer Premises Equipment (CPE) of subscribers to the HFC. Amplifiers may be used in the node to amplify upstream (US) signals and downstream (DS) signals. Embodiments of the disclosure may provide an echo cancellation (EC) process that may support Full Duplex (FDX) Data Over Cable Service Interface Specification (DOCSIS) operation.

FIG. 1 is a block diagram of a system 100 for providing Echo Cancellation (EC) training consistent with embodiments of the disclosure. System 100 may comprise a Distributed Access Architecture (DAA). As shown in FIG. 1, system 100 may comprise a core 105, a remote PHY device (RPD) 110, a Full Duplex (FDX) amplifier 115, and a plurality of Customer Premises Equipment (CPE) 120. Core 105 may comprise a Converged Cable Access Platform (CCAP) core and may include a Cable Modem Termination System (CMTS) 125. FDX amplifier 115 may comprise an echo canceler 130. Plurality of CPE 120 may comprise a first CPE 135 and a second CPE 140.

CMTS 125 may comprise a device located in a service provider's (e.g., a cable company's) headend (i.e., core 105) that may be used to provide high speed data services, such as cable Internet or Voice-Over-Internet Protocol, to subscribers. Remote physical layer (i.e., RPHY) may comprise shifting or distributing the physical layer (i.e., PHY) of a conventional cable headend CMTS to fiber nodes (e.g., RPD nodes) in a network. RPD 110 may comprise circuitry to implement the physical layer of CMTS 125. First CPE 135 and second CPE 140 may comprise, but are not limited to, a Cable Modem (CM), a cellular base station, a tablet device, a mobile device, a smart phone, a telephone, a remote control device, a set-top box, a digital video recorder, a personal computer, a network computer, a mainframe, a router, or other similar microcomputer-based device.

RPD 110 may comprise a node in an HFC network. RPD 110 may comprise a container that may house optical and electrical circuitry. An optical fiber cable 145 may be connected to one side of RPD 110 and a coaxial cable 150 may be connected to the other side of RPD 110. Optical fiber cable 145 may be connected to CMTS 125 in core 105 in the HFC network. Coaxial cable 150 may connect RPD 110 to FDX amplifier 115. FDX amplifier 115 may be connected to plurality of CPE 120 of subscribers to the HFC via plurality of coaxial cables 155. As such, RPD 110 and FDX amplifier 115 may facilitate communications between core 105 and plurality of CPE 120.

Elements described above of system 100 (e.g., RPD 110, FDX amplifier 115, CMTS 125, echo canceler 130, first CPE 135, and second CPE 140) may be practiced in hardware and/or in software (including firmware, resident software, micro-code, etc.) or in any other circuits or systems. Elements of system 100 may be practiced in electrical circuits comprising discrete electronic elements, packaged or integrated electronic chips containing logic gates, a circuit utilizing a microprocessor, or on a single chip containing electronic elements or microprocessors. Elements of system 100 may also be practiced using other technologies capable of performing logical operations such as, for example, AND, OR, and NOT, including but not limited to, mechanical, optical, fluidic, and quantum technologies. As described in greater detail below with respect to FIG. 6, elements of system 100 may be practiced in a computing device 600.

Consistent with embodiments of the disclosure, system 100 may support FDX DOCSIS operation and may provide an Echo Cancellation (EC) training scheme for FDX amplifier 115. FDX amplifier 115 may be used for FDX N+M deployment, where N may represent RPD 110 and M may comprise the number of FDX amplifiers 115 that may be connected between RPD 110 and plurality of CPE 120.

Figure 2:
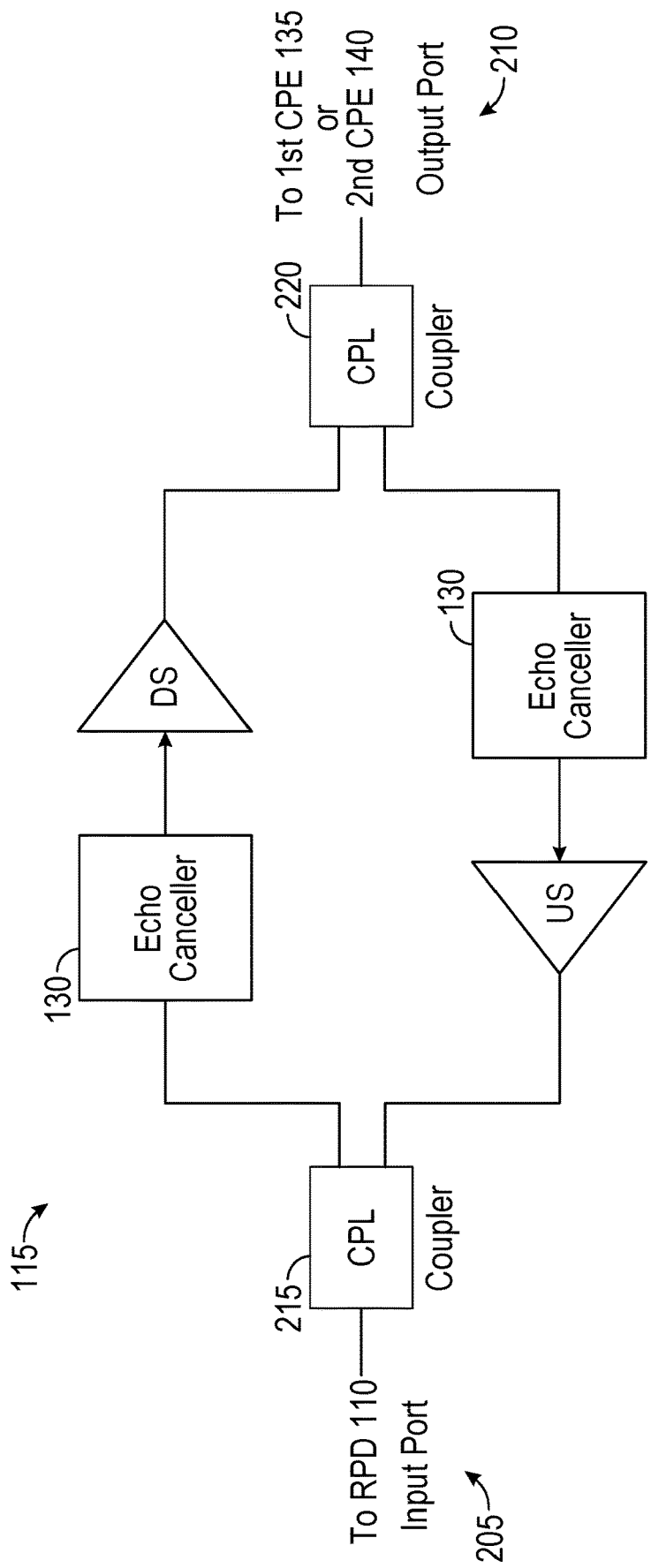
FIG. 2 shows a Full Duplex (FDX) amplifier.

FIG. 2 shows FDX amplifier 115. As illustrated by FIG. 2, FDX operations may introduces co-channel interferences (i.e., echoes) from transmitter to receiver. More specifically, in the case of FDX amplifier 115, there may be echoes from an US signal to a DS signal at an input port 205, and echoes from the DS signal to the US signal at an output port 210. For example, the US echo may comprise a signal reflected by the US signal onto the DS signal at an input port coupler 215. The DS echo may comprise a signal reflected by the DS signal onto the US signal at an output port coupler 220. Echo cancellation may be implemented at both input port 205 and output port 210 to ensure proper operation of FDX amplifier 115. FDX amplifier 115 may have multiple output ports, but only one output port is shown for illustration.

Echo cancellation may require an EC training window. The EC training window may comprise a period of times when the echoes may be observed and characterized without interference from desired signals. At output port 210 of FDX amplifier 115, the echo may come from the DS and may need to be observed, characterized, and canceled out at the US receiver. US EC training windows may comprise periods of time (i.e., symbols) without an US signal. The US EC training window may be scheduled by CMTS 125.

At input port 205 of FDX amplifier 115, an echo may come from the US signal. This echo may be observed, characterized, and canceled out at the DS receiver. For this purpose, a period of time without a DS signal may be useful. Unfortunately, there may be no process to mute the DS signal because the DS signal may be continuous in time and may always be present regardless of DS traffics. In other words, a DS EC training window may not be created by muting the DS signal. Accordingly, there may be a need for a DS EC training process that may allow echoes of US signal (i.e., upstream echoes) to be observed and characterized accurately at the DS receiver without muting the DS signal. Embodiments of the disclosure may provide a DS EC training process that may generate, for example, a staircase 2-dimensional DS EC training window by subtracting out DS scattered pilots from the DS signal in order to observes and characterizes US echoes on the locations of the DS scattered pilots where the signals of scattered pilots have been subtracted out.

Figure 3:
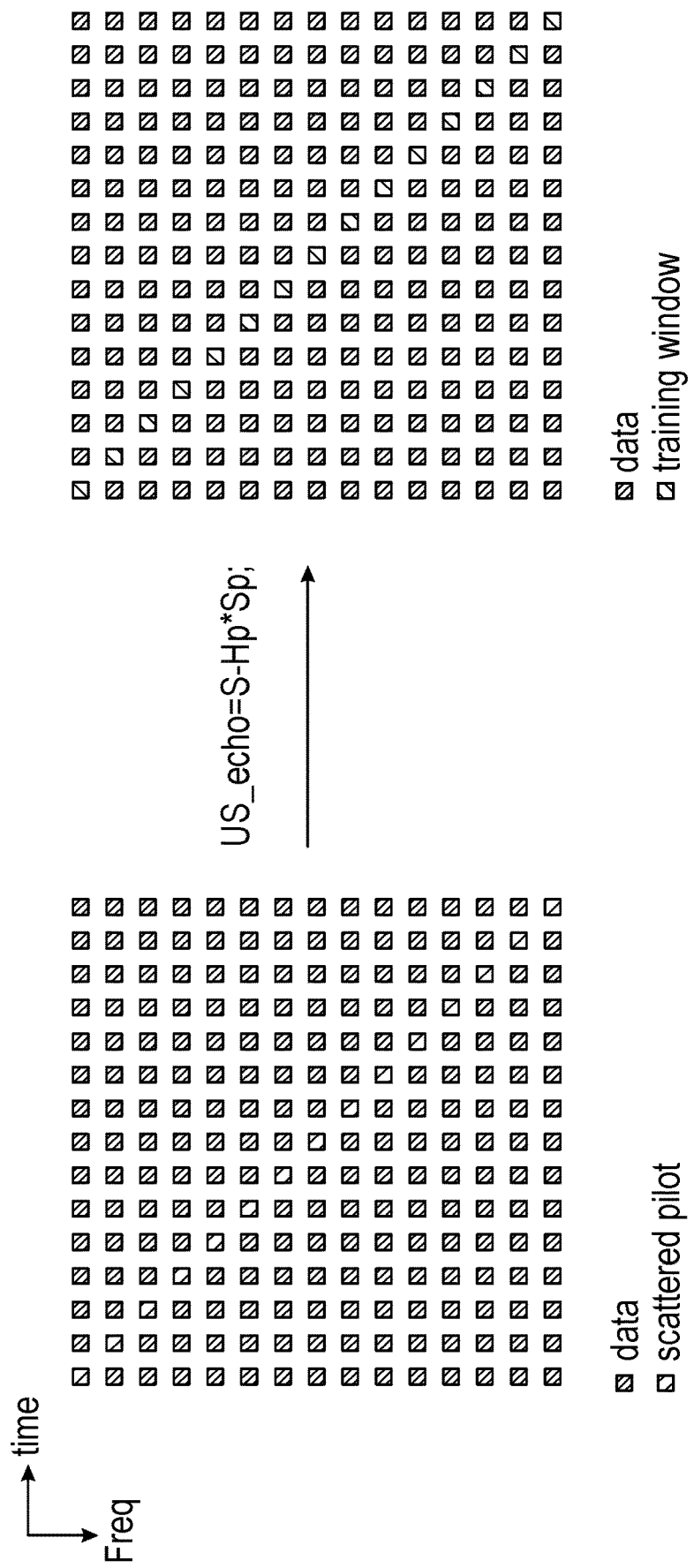
FIG. 3 illustrates a staircase EC training window.

FIG. 3 illustrates a staircase EC training window. As will be described in greater detail below, by subtracting out the scattered pilots, a 2-dimensional staircase EC training window may be generated. FDX amplifier 115 may support a DS signal that is in compliance with Full Duplex (FDX) Data Over Cable Service Interface Specification (DOCSIS) 3.1. The DOCSIS 3.1 DS signal may include scattered pilots on each subcarrier. The scattered pilots may be Binary Phase Shift Keying (BPSK) modulated with known bits, and may be on fixed locations, for example, with a 128 symbol interval. Other types of modulation and symbol intervals way be used and embodiments of the disclosure are not limited to the aforementioned.

By subtracting out the scattered pilots as shown in FIG. 3, training windows may be generated as shown in FIG. 3. Per DOCSIS 3.1, the scattered pilots may be asserted only on active subcarriers outside of a Physical Layer Link Channel (PLC). However, EC training on subcarriers within the PLC may be done on PLC preambles. Like scattered pilots, PLC preambles may be BPSK modulated with known bits on fixed locations. Accordingly, EC training on subcarriers on PLC preambles may follow the same process as on scattered pilots.

Figure 4:
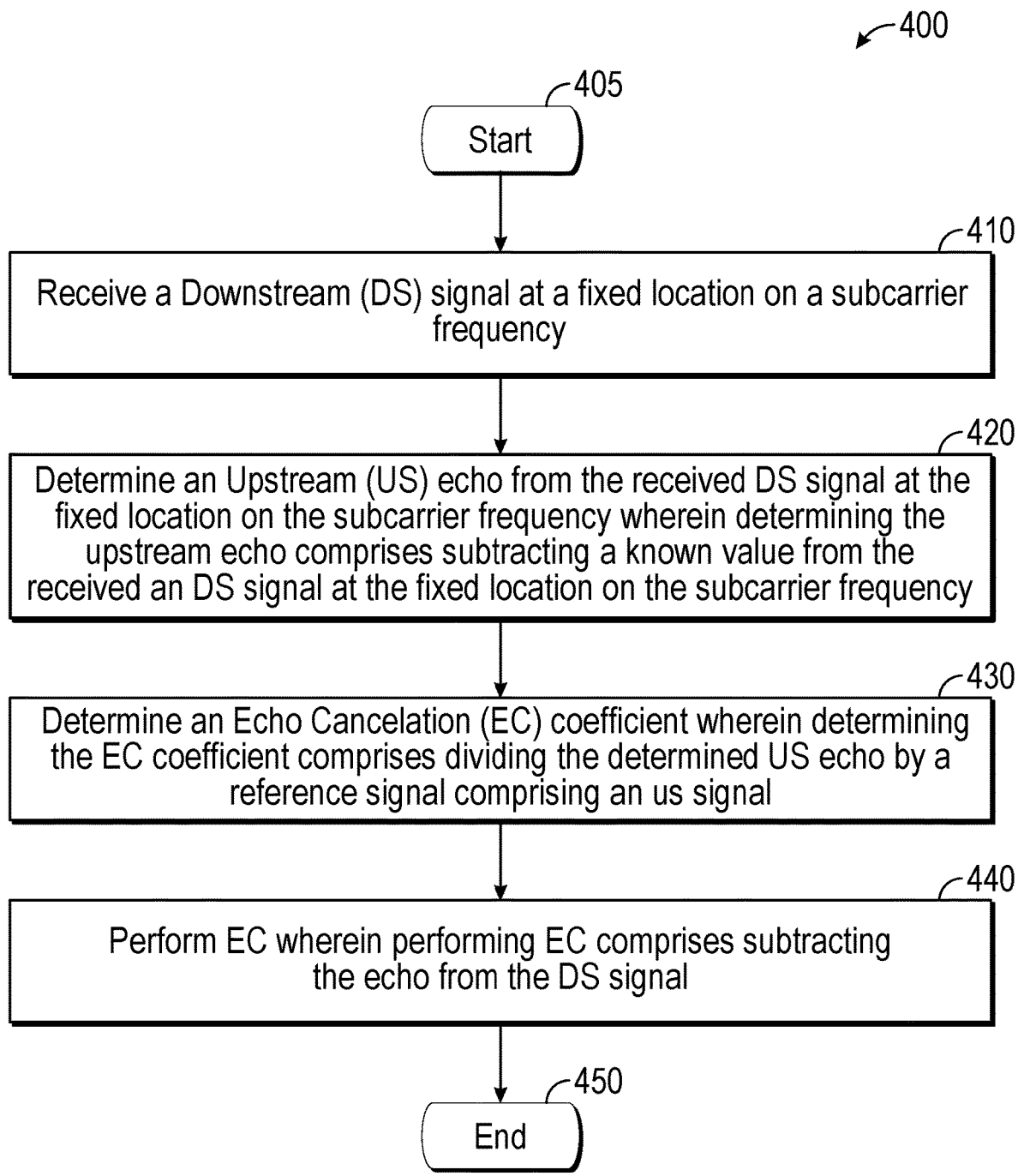
FIG. 4 is a flow chart of a method for providing EC training.

FIG. 4 is a flow chart setting forth the general stages involved in a method 400 consistent with an embodiment of the disclosure for providing Echo Cancellation (EC) training. Method 400 may be implemented using echo canceler 130 as described in more detail above with respect to FIG. 1. Ways to implement the stages of method 400 will be described in greater detail below.

Method 400 may begin at starting block 405 and proceed to stage 410 where echo canceler 130 may receive a Downstream (DS) signal at a fixed location on a subcarrier frequency. For example, the DS signal may be DOCSIS 3.1 compliant and may comprise subcarriers with scattered pilots or PLC preambles.

From stage 410, where echo canceler 130 receives the DS signal, method 400 may advance to stage 420 where echo canceler 130 may determine an Upstream (US) echo from the received DS signal at the fixed location on the subcarrier frequency. Determining the upstream echo may comprise subtracting a known value from the received DS signal at the fixed location on the subcarrier frequency. For example, at each scattered pilot location, echo canceler 130 may extract the US echo by subtracting the scattered pilot out of the total DS signal:

$$US\_echo = S - Hp*Sp \qquad \text{Eq.1}$$

As shown in Eq. 1, S may comprise the total DS signal observed at a scattered pilot location in 2-dimensional (subcarrier×symbol) space. Sp may comprise the symbol of the scattered pilot. Hp may comprise the channel coefficient of the scattered pilot. Hp and Sp are values known by echo canceler 130. Accordingly, US_echo may comprise the US echo extracted from the total DS signal (i.e., S).

Scattered pilot channel Hp may be computed, for example, by a moving average. For example, Hp=E{hp}, where hp is the channel coefficient observed at each instance. E{ } stands for averaging with a pre-defined length.

Once echo canceler 130 determines the US echo from the received DS signal at the fixed location on the subcarrier frequency in stage 420, method 400 may continue to stage 430 where echo canceler 130 may determine an Echo Cancelation (EC) coefficient wherein determining the EC coefficient comprises dividing the determined US echo by a reference signal comprising an US signal. For example, the EC coefficient may be determined as follows:

$$Cec = US\_echo/S0$$

Figure 5:
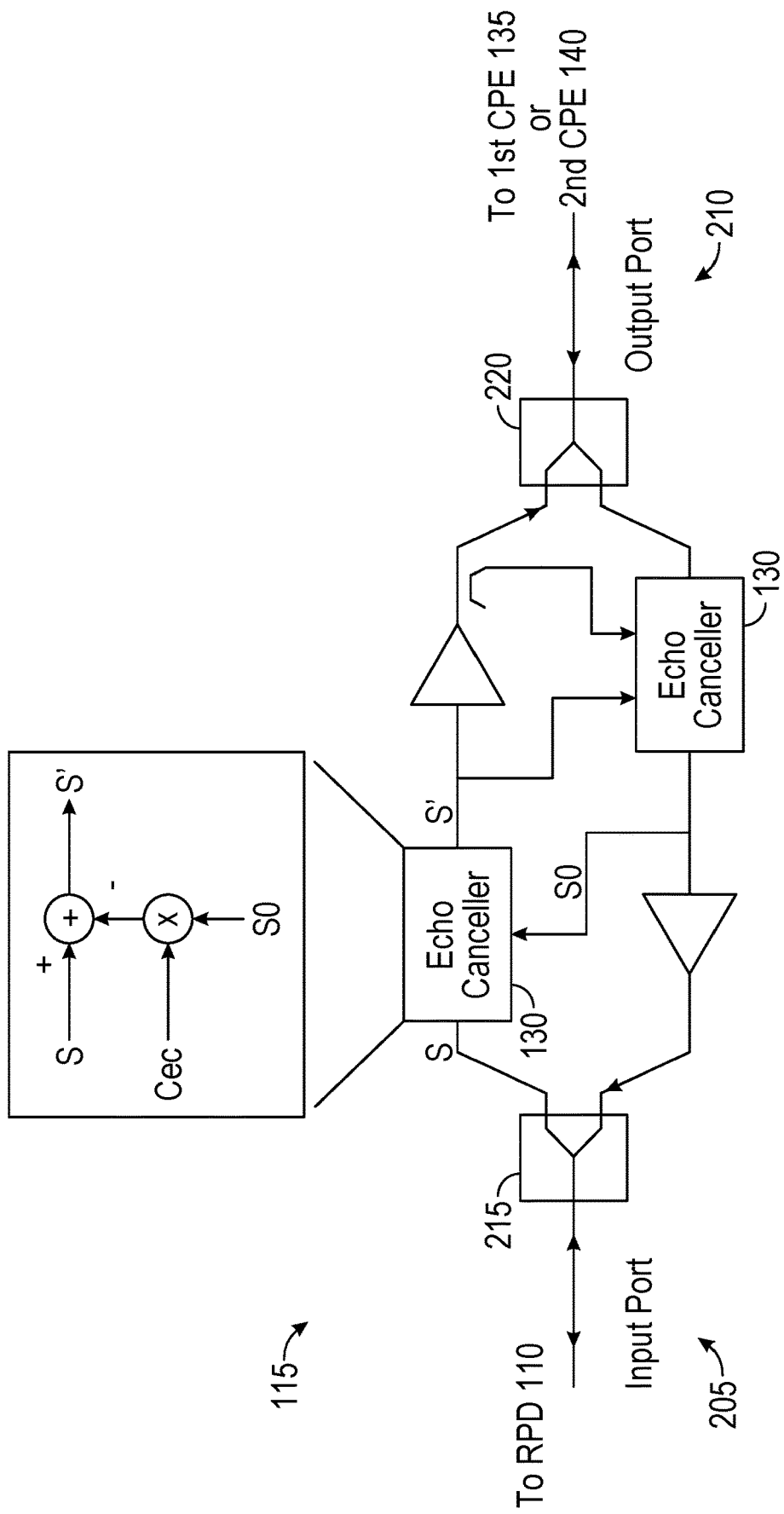
FIG. 5 shows an FDX amplifier.

S0 may comprise the US signal (i.e., reference signal used in EC) and US_echo may comprise the echo extracted using Eq.1 as described above. FIG. 5 illustrates where in FDX amplifier 115 S0 may be obtained.

After echo canceler 130 determines the EC coefficient in stage 430, method 400 may proceed to stage 440 where echo canceler 130 may perform EC wherein performing EC comprises subtracting the echo from the DS signal. For example, once the EC coefficient on the subcarrier is computed, EC at input port 205 may be performed through subtraction as shown in FIG. 5. Because the US transmitter power may be low, there may be no need to cancel out its noise floor. This process may be repeated for each training window shown in FIG. 3 along the time/frequency spectrum. Once echo canceler 130 performs EC in stage 440, method 400 may then end at stage 450.

Figure 6:
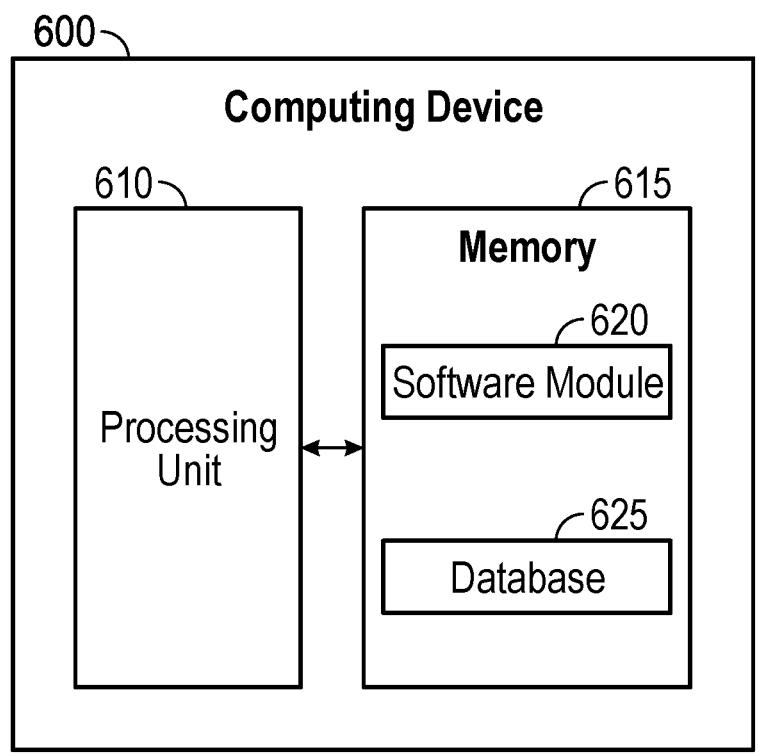
FIG. 6 is a block diagram of a computing device.

FIG. 6 shows computing device 600. As shown in FIG. 6, computing device 600 may include a processing unit 610 and a memory unit 615. Memory unit 615 may include a software module 620 and a database 625. While executing on processing unit 610, software module 620 may perform, for example, processes for providing Echo Cancellation (EC) training, including for example, any one or more of the stages from method 400 described above with respect to FIG. 4. Computing device 600, for example, may provide an operating environment for RPD 110, FDX amplifier 115, CMTS 125, echo canceler 130, first CPE 135, and second CPE 140. RPD 110, FDX amplifier 115, CMTS 125, echo canceler 130, first CPE 135, and second CPE 140 may operate in other environments and is not limited to computing device 600.

Computing device 600 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 600 may comprise any computer operating environment, such as hand-held devices, multiprocessor systems, microprocessor-based or programmable sender electronic devices, minicomputers, mainframe computers, and the like. Computing device 600 may also be practiced in distributed computing environments where tasks are performed by remote processing devices. The aforementioned systems and devices are examples and computing device 600 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 600 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
receiving a Downstream (DS) signal at a fixed location on a subcarrier frequency;
determining an Upstream (US) echo from the received DS signal at the fixed location on the subcarrier frequency, wherein determining the US echo comprises subtracting a known value from the received DS signal at the fixed location on the subcarrier frequency, and wherein the known value is Binary Phase Shift Keying (BPSK) modulated with known bits at the fixed location;
determining an Echo Cancelation (EC) coefficient based on the US echo, wherein determining the EC coefficient based on the US echo comprises dividing the determined US echo by a reference signal comprising an US signal; and
performing EC based on the EC coefficient, wherein performing EC based on the EC coefficient comprises subtracting the EC coefficient from the DS signal.

2. The method of claim 1, wherein receiving the DS signal at the fixed location on the subcarrier frequency comprises receiving the DS signal at the fixed location on the subcarrier frequency wherein the fixed location on the subcarrier frequency comprises a location of a scattered pilot.

3. The method of claim 1, wherein receiving the DS signal at the fixed location on the subcarrier frequency comprises receiving the DS signal at the fixed location on the subcarrier frequency wherein the fixed location on the subcarrier frequency comprises a location of a Physical Layer Link Channel (PLC) preamble.

4. The method of claim 1, wherein determining the US echo comprises determining the US echo wherein the US echo comprises a signal reflected by the US signal onto the DS signal at an input port coupler.

5. The method of claim 1, wherein determining the US echo comprises determining the US echo wherein the US echo comprises a signal reflected by the US signal onto the DS signal at an input port coupler of a Full Duplex (FDX) amplifier.

6. The method of claim 1, wherein receiving the DS signal comprises receiving the DS signal wherein the DS signal is complaint with Full Duplex (FDX) Data Over Cable Service Interface Specification (DOCSIS) 3.1.

7. The method of claim 1, wherein receiving the DS signal at the fixed location comprises receiving the DS signal a node of Hybrid Fiber-Coaxial (HFC) network.

8. A system comprising:
a memory storage; and
a processing unit coupled to the memory storage, wherein the processing unit is operative to:
receive a Downstream (DS) signal at a fixed location on a subcarrier frequency;
determine an Upstream (US) echo from the received DS signal at the fixed location on the subcarrier frequency, wherein the processing unit being operative to determine the US echo comprises the processing unit being operative to subtract a known value from the received DS signal at the fixed location on the subcarrier frequency, and wherein the known value is Binary Phase Shift Keying (BPSK) modulated with known bits at the fixed location;
determine an Echo Cancelation (EC) coefficient based on the US echo, wherein the processing unit being operative to determine the EC coefficient based on the US echo comprises the processing unit being operative to divide the determined US echo by a reference signal comprising an US signal; and
perform EC based on the EC coefficient, wherein the processing unit being operative to perform EC based on the EC coefficient comprises the processing unit being operative to subtract the EC coefficient from the DS signal.

9. The system of claim 8, wherein the fixed location on the subcarrier frequency comprises a location of a scattered pilot.

10. The system of claim 8, wherein the fixed location on the subcarrier frequency comprises a location of a Physical Layer Link Channel (PLC) preamble.

11. The system of claim 8, wherein the US echo comprises a signal reflected by the US signal onto the DS signal at an input port coupler.

12. The system of claim 8, wherein the US echo comprises a signal reflected by the US signal onto the DS signal at an input port coupler of a Full Duplex (FDX) amplifier.

13. The system of claim 8, wherein the DS signal is complaint with Full Duplex (FDX) Data Over Cable Service Interface Specification (DOCSIS) 3.1.

14. A non-transitory computer-readable medium that stores a set of instructions which when executed perform a method comprising:
receiving a Downstream (DS) signal at a fixed location on a subcarrier frequency;
determining an Upstream (US) echo from the received DS signal at the fixed location on the subcarrier frequency,. wherein determining the US echo comprises subtracting a known value from the received DS signal at the fixed location on the subcarrier frequency, and wherein the known value is Binary Phase Shift Keying (BPSK) modulated with known bits at the fixed location;
determining an Echo Cancelation (EC) coefficient based on the US echo, wherein determining the EC coefficient based on the US echo comprises dividing the determined US echo by a reference signal comprising an US signal; and
performing EC based on the EC coefficient, wherein performing EC based on the EC coefficient comprises subtracting the EC coefficient from the DS signal.

15. The non-transitory computer-readable medium of claim 14, wherein receiving the DS signal at the fixed location on the subcarrier frequency comprises receiving the DS signal at the fixed location on the subcarrier frequency wherein the fixed location on the subcarrier frequency comprises a location of a scattered pilot.

16. The non-transitory computer-readable medium of claim 14, wherein receiving the DS signal at the fixed location on the subcarrier frequency comprises receiving the DS signal at the fixed location on the subcarrier frequency wherein the fixed location on the subcarrier frequency comprises a location of a Physical Layer Link Channel (PLC) preamble.

17. The non-transitory computer-readable medium of claim 14, wherein determining the US echo comprises determining the US echo wherein the US echo comprises a signal reflected by the US signal onto the DS signal at an input port coupler.

18. The non-transitory computer-readable medium of claim 14, wherein determining the US echo comprises determining the US echo wherein the US echo comprises a signal reflected by the US signal onto the DS signal at an input port coupler of a Full Duplex (FDX) amplifier.

19. The non-transitory computer-readable medium of claim 14, wherein receiving the DS signal comprises receiving the DS signal wherein the DS signal is complaint with Full Duplex (FDX) Data Over Cable Service Interface Specification (DOCSIS) 3.1.

20. The non-transitory computer-readable medium of claim 14, wherein receiving the DS signal at the fixed location comprises receiving the DS signal a node of Hybrid Fiber-Coaxial (HFC) network.

* * * * *